(12) United States Patent
Hedrich

(10) Patent No.: US 6,330,463 B1
(45) Date of Patent: Dec. 11, 2001

(54) VOLTAGE SUPPLY APPARATUS, IN PARTICULAR FOR A RADIO TELEPHONE IN A MOTOR VEHICLE

(75) Inventor: Jens Hedrich, Bochum (DE)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/215,595

(22) Filed: Dec. 17, 1998

(30) Foreign Application Priority Data

Dec. 22, 1997 (DE) .............................................. 197 57 362

(51) Int. Cl.⁷ ................................. H04B 1/38; H04B 1/16
(52) U.S. Cl. ........................... 455/573; 455/343; 455/572
(58) Field of Search .................................. 455/572, 573, 455/574, 127, 90, 343

(56) References Cited

U.S. PATENT DOCUMENTS

| | | | |
|---|---|---|---|
| 4,647,722 | * 3/1987 | Nishida et al. ...................... | 455/572 |
| 4,962,523 | * 10/1990 | Tanaka ................................. | 455/127 |
| 5,023,468 | 6/1991 | Drobny et al. ...................... | 307/10.1 |
| 5,036,532 | * 7/1991 | Metroka et al. .................... | 455/127 |
| 5,208,494 | 5/1993 | Ikonen et al. ...................... | 307/572 |
| 5,241,284 | 8/1993 | Nyqvist et al. ..................... | 330/297 |
| 5,382,893 | 1/1995 | Dehnel ................................ | 320/32 |
| 5,402,056 | * 3/1995 | Ketterling ........................... | 320/140 |
| 5,519,711 | 5/1996 | Sointula .............................. | 370/95.3 |
| 5,590,414 | * 12/1996 | Marui et al. ........................ | 455/90 |
| 5,610,805 | 3/1997 | Gupta .................................. | 363/37 |
| 5,646,977 | * 7/1997 | Koizumi ............................. | 455/572 |
| 5,682,093 | 10/1997 | Kivela ................................. | 323/273 |
| 5,805,998 | * 9/1998 | Kodama .............................. | 455/573 |

FOREIGN PATENT DOCUMENTS

| | | |
|---|---|---|
| 38 05 810 A1 | 9/1989 | (DE). |
| 40 04 816 A1 | 9/1991 | (DE). |
| 196 50 176A1 | 6/1997 | (DE). |
| 0435317 A2 | 7/1991 | (EP). |
| 0624944 A2 | 11/1994 | (EP). |
| 0660520 A2 | 6/1995 | (EP). |
| WO 94/09545 | 4/1994 | (WO). |

OTHER PUBLICATIONS

German Office Action on Application No. 197 57 362.2–31.

* cited by examiner

Primary Examiner—Vivian Chang
Assistant Examiner—Eliseo Ramos-Feliciano
(74) Attorney, Agent, or Firm—Perman & Green, LLP

(57) ABSTRACT

The invention relates to a voltage supply apparatus, in particular for a radio telephone, in a motor vehicle having a main voltage source (10) which is connected to one input (12) of a voltage matching circuit (13) which derives at least one supply voltage ($U_{12}$, $U_5$) for the radio telephone (22) from the voltage ($U_B$, $U_N$) present at its input, and an auxiliary voltage source (26) which can be connected via a controllable switch (27) to the input (12) of the voltage matching circuit (13). In order to ensure uninterrupted operation of the radio telephone (22) in the event of failure of the main voltage source (10), a voltage monitoring circuit (15) is provided, to which a voltage signal which corresponds to the voltage ($U_B$) of the main voltage source is supplied and which supplies a switch control signal in order to connect the auxiliary voltage source (26) to the input of the voltage matching circuit (13) in an emergency in the event of failure of the main voltage source (10).

3 Claims, 2 Drawing Sheets

VOLTAGE SUPPLY APPARATUS, IN PARTICULAR FOR A RADIO TELEPHONE IN A MOTOR VEHICLE

CROSS-REFERENCE TO THE INVENTION

Not Applicable

BACKGROUND OF THE INVENTION

1. Field of the Invention

Figure 1:
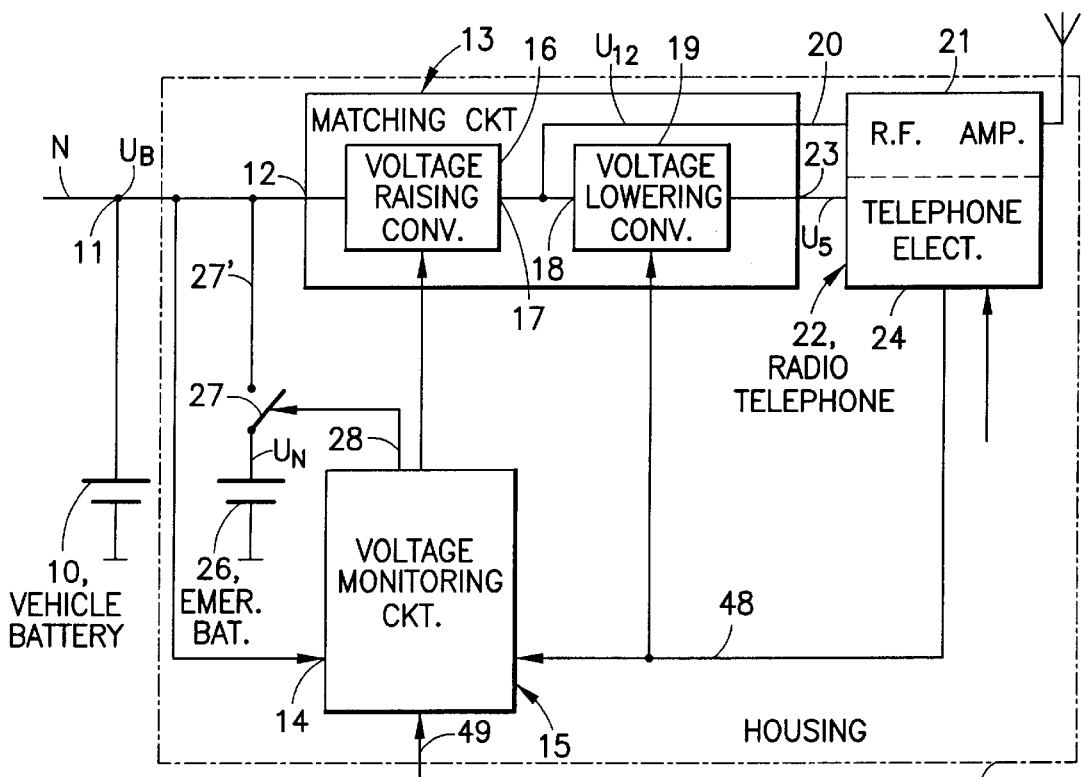

The invention relates to a voltage supply apparatus, in particular for a radio telephone in a motor vehicle.

2. Description of the Related Art Including Information Disclosed Under 37 CFR 1.97 AND 1.98

A radio telephone which is permanently installed in a motor vehicle is normally supplied with power from the vehicle electrical system. It is thus connected to the vehicle electrical system such that the operating current for the radio telephone is supplied from the vehicle battery or from the generator, depending on the operating state of the vehicle electrical system. In this case, the supply voltage or supply voltages for the radio telephone, that is to say for the transmission radio-frequency amplifier and the rest of the telephone electronics, is or are taken from an appropriate power supply unit or a voltage matching circuit, on which the vehicle electrical system voltage from about 10 V to 16 V, if the rated voltage is 12 V, is present.

If the connection between the radio telephone and the vehicle electrical system is interrupted or if the vehicle battery is disconnected from the vehicle electrical system, then the voltage supply for the radio telephone thus fails, and telephoning is no longer possible.

Particularly if the vehicle electrical system fails as a result of an accident, in which the vehicle battery is ripped out or destroyed, it is desirable for the radio telephone still to be operable, at least for a certain time, in order to make an emergency call.

Proceeding from this, the invention is based on the object of providing a voltage supply apparatus for a radio telephone, in particular in a motor vehicle, which still allows telephone calls to be made, at least for a certain time, even in the event of failure of a main voltage source.

BRIEF SUMMARY OF THE INVENTION

This object is achieved by the voltage supply apparatus according to claim 1.

Thus, according to the invention, a main voltage source and an auxiliary voltage source are provided for a voltage supply apparatus, in particular for a voltage supply apparatus for a radio telephone, the auxiliary voltage source being disconnected from the rest of the circuit by means of a switch during normal operation, so that it makes no contribution to the voltage supply. In order to ensure uninterrupted operation of the radio telephone in the event of failure of the main voltage source, a voltage monitoring circuit is provided which monitors the voltage supplied by the main voltage source and, if this fails, that is to say if it falls below a predetermined value, causes the auxiliary voltage source to be connected in order to supply voltage.

It is particularly advantageous in this case if the voltage matching circuit comprises a first voltage converter which outputs a first supply voltage at its output, and a second voltage converter which supplies a second supply voltage which is less than the first supply voltage, the output of the first voltage converter being connected to the input of the second voltage converter, in order to simplify the circuit.

Thus, according to the invention, the voltage supplied by the main voltage source or, possibly, by the auxiliary voltage source is initially used to derive from said voltage a first, relatively high supply voltage which is used in particular to supply the transmission radio-frequency amplifier and from which a second, relatively low supply voltage is preferably derived for the rest of the telephone electronics.

A development of the invention preferably provides for the first voltage converter to have a voltage-raising circuit in addition to a filter circuit. In this case, in order to allow even batteries with a relatively low output voltage to be used, in particular, for the auxiliary voltage source, which is intended for emergencies, the auxiliary voltage source can be connected via the controllable switch to the input of the voltage matching circuit. This therefore makes it possible to use a battery whose output voltage is, for example, 5 V, preferably a non-rechargeable primary cell, as the auxiliary voltage source, even if the voltage supply apparatus according to the invention is used in a motor vehicle having a vehicle electrical system with a rated voltage of 12 V.

The use of primary cells has the advantage that they have a high energy density, that is to say occupy little space, and at the same time are mechanically very robust in comparison with a vehicle battery, normally a lead-acid accumulator, so that, even in an emergency, for example in the event of a dangerous vehicle impact in an accident, they are not damaged and thus have high operational reliability. Furthermore, primary cells, such as $LiMnO_2$ batteries, have a low self-discharge rate, so that they remain serviceable even over a period of several years.

According to a further refinement of the invention, it is also expediently possible to provide the capability for the auxiliary voltage source to be connected via the controllable switch to one input of the second voltage converter of the voltage matching circuit. This refinement is particularly expedient if the auxiliary voltage source is an emergency battery which supplies a relatively high voltage, for example a no-load voltage of 18 V, since the auxiliary voltage source in this arrangement is not additionally loaded by the first voltage converter during emergency operation.

In order to ensure continuous operation of the radio telephone even while switching over from the main voltage source to the auxiliary voltage source, and in particular to an auxiliary voltage source with a lower voltage than that of the main voltage source, the invention provides for the voltage-raising circuit to be controllable as a function of the voltage of the main voltage source when the radio telephone is switched on or when the ignition is switched on. This makes it possible for the voltage-raising circuit to be switched on even before the auxiliary voltage source is switched on, while the main voltage source is still supplying a voltage whose value is, however, less than the minimum value of the first supply voltage.

A drop in the voltage supplied by the main voltage source also occurs, for example, if the main voltage source is destroyed or is at least disconnected from the vehicle electrical system, and thus also from the input of the voltage matching circuit. The voltage-raising circuit, which is required when the radio telephone is being operated by means of the auxiliary voltage source, prevents an interruption in the voltage supply for the radio telephone.

The voltage supply apparatus operates particularly reliably if the voltage-raising circuit has a control input which is connected to the output of the first voltage converter, in order to keep the supply voltage at a stabilized value independently of the voltage which is present at the input.

When the voltage supply apparatus according to the invention is used for a radio telephone in a motor vehicle, to ensure that the telephone electronics in the radio telephone, excluding the radio-frequency amplifier, are continuously supplied with voltage without unnecessarily loading the connecting voltage sources, the invention provides for the second voltage converter to comprise a first, continuously operating, voltage-reducing circuit and, in parallel with this, a second voltage-reducing circuit, which can be switched on and off, the first voltage-reducing circuit being a linear regulator and the second voltage-reducing circuit being a DC/DC voltage converter, which is switched on whenever the ignition and/or the radio telephone are/is switched on.

Thus, in the situation when the ignition and the radio telephone are switched off, the voltage is supplied entirely via a linear regulator, which is preferably designed as an integrated transistor circuit, while, when the radio telephone is switched on and/or the ignition is switched on, the voltage supply for the telephone electronics is ensured by a DC/DC voltage converter, which has a low power loss even when the power consumption is raised and ensures a constant voltage supply for the telephone electronics.

A smooth change over from the main voltage source to the auxiliary voltage source can be achieved in a particularly advantageous manner if the voltage monitoring circuit has a first comparator circuit and a second comparator circuit, which comparator circuits compare a voltage signal which corresponds to the voltage of the main voltage source with a reference voltage signal, the first comparator circuit supplying a switch-on signal for a voltage-raising circuit in a first voltage converter of the voltage matching circuit if the voltage of the main voltage source falls below a first value, and the second comparator circuit supplying the switch control signal if the voltage of the main voltage source falls below a second value.

In order in this case to ensure that the auxiliary voltage source is not switched on whenever the voltage supplied from the vehicle battery briefly falls below a predetermined value, for example when the engine is being started, the invention provides for the second comparator circuit to emit the switch control signal only if the voltage falls below a minimum voltage, preferably below the lowest voltage which can be expected during starting of the vehicle engine.

In order furthermore to prevent the auxiliary voltage source from being activated when, for example, the vehicle battery is removed during workshop maintenance, the invention provides for the switch control signal to be emitted by the second comparator circuit via a gate circuit, which normally allows the switch control signal to be passed on and which can be switched off, in particular for maintenance purposes, by means of a signal which can be injected. This reliably prevents the auxiliary voltage source from being switched on, and thus being unnecessarily loaded, when the vehicle battery has been disconnected for servicing purposes.

In order to reduce the load on the respectively connected voltage source further, the invention provides for the switch-on signal to be emitted by the first comparator circuit via a further gate circuit which allows the switch-on signal to be passed on only if the ignition and/or the radio telephone are/is switched on.

In order to ensure that the connection between the auxiliary voltage source and the radio telephone is not interrupted during an accident, the invention provides for the auxiliary voltage source to be accommodated together with the voltage matching circuit and the voltage monitoring circuit in a housing with the radio telephone. This ensures that there is a high probability that, even if the vehicle is involved in a serious accident, the radio telephone is still operable for a certain time using the energy stored in the auxiliary voltage source, so that the vehicle occupants or an emergency telephone system provided for this purpose in the vehicle can make an emergency call to the rescue services.

BRIEF DESCRIPTION OF THE SEVERAL VIEWS OF THE DRAWING(S)

Figure 2:
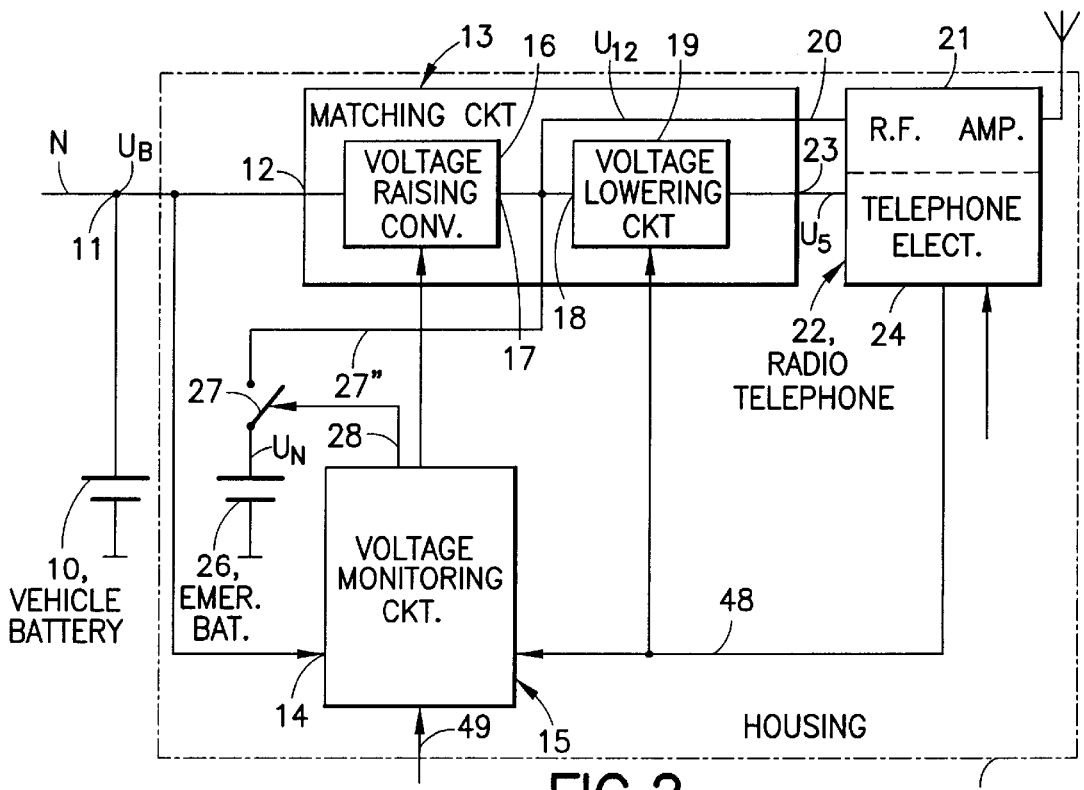
Figure 3:
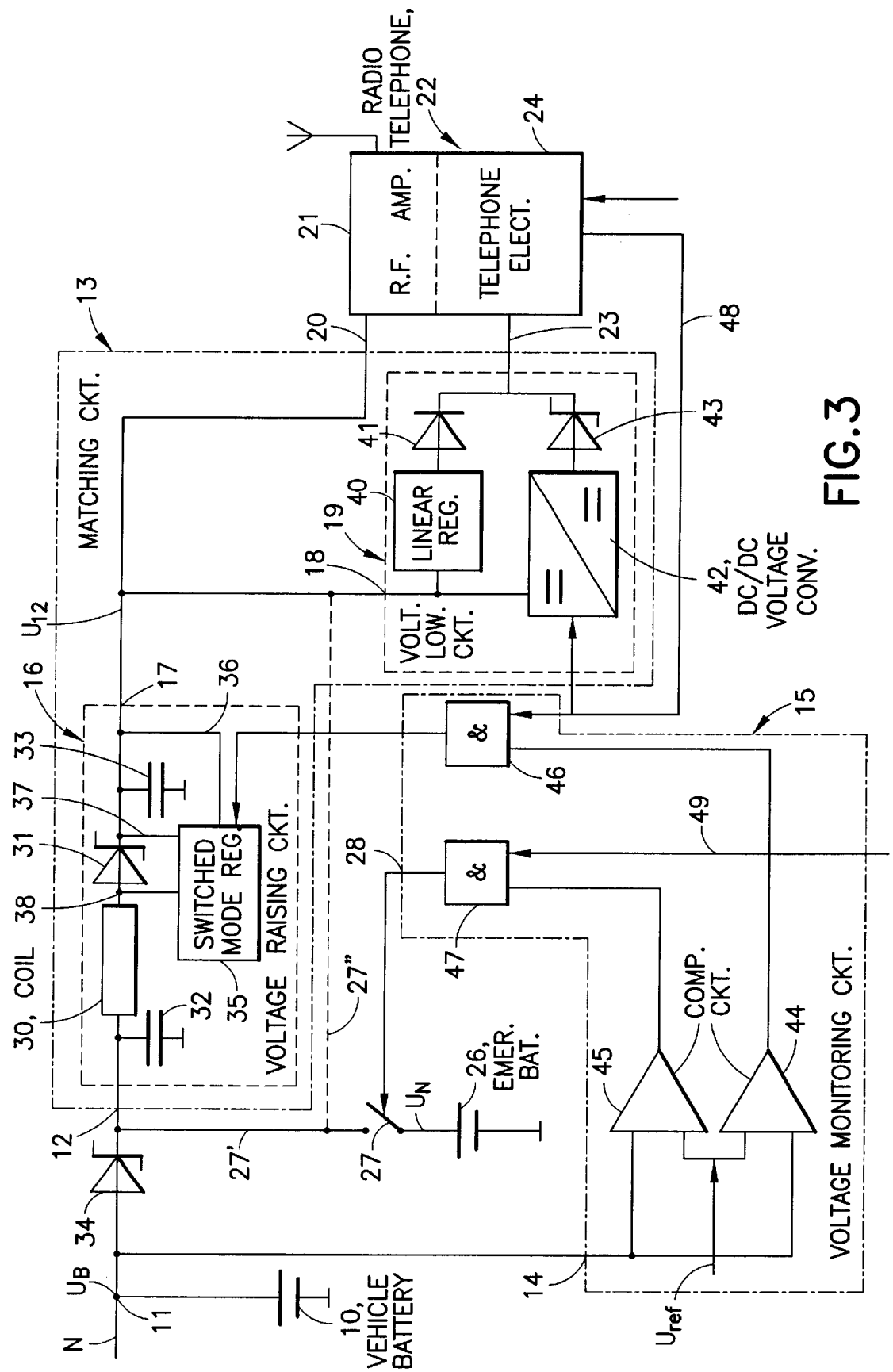

The invention will be explained in more detail in the following text using a drawing, by way of example, in which:

FIG. 1 shows a simplified, schematic block diagram of a voltage supply apparatus for a radio telephone, FIG. 2 shows a simplified, schematic block diagram of a voltage supply apparatus for a radio telephone, according to a further refinement of the invention, and FIG. 3 shows a schematic circuit diagram of the voltage supply apparatus according to FIG. 1 or 2, showing the individual circuit blocks in more detail.

Mutually corresponding circuit parts and components are provided with the same reference symbols in the various figures of the drawing.

DETAILED DESCRIPTION OF THE INVENTION

Each of the voltage supply apparatuses shown in FIGS. 1 and 2 for a radio telephone in a motor vehicle comprises a vehicle battery 10 as the main voltage source, in particular the starter battery in the vehicle electrical system N, which is connected to a connecting terminal 11 of the vehicle battery 10. The voltage $U_B$ which is present at the connecting terminal 11 and is supplied from the vehicle electrical system generator or the vehicle battery 10 is applied on the one hand to one input 12 of a voltage matching circuit 13 and on the other hand to a first input 14 of a voltage monitoring circuit 15.

The voltage matching circuit 13 has a first voltage-raising converter 16 which is connected to the input 12 and whose output 17 is connected to an input 18 of a second voltage-lowering converter 19 and to a first input 20 of the voltage matching circuit 13. The first voltage converter 16 supplies a first supply voltage $U_{12}$ which is, for example, 12 V, and is used as the supply voltage for a transmission radio-frequency amplifier 21 in a radio telephone 22.

The second voltage converter 19 uses the first supply voltage $U_{12}$ to derive a second supply voltage $U_5$, which is supplied via a second output 23 of the voltage matching circuit 13 to the rest of the telephone electronics 24. The second supply voltage $U_5$ is in this case, for example, 3 V or 5 V. The value of the supply voltage $U_5$ is in this case dependent on the circuit technology used. If the telephone electronics 24 require a supply voltage of 3 V, while the voltage matching circuit 13 supplies a second supply voltage $U_5$ of 5 V at the second output 23, a further voltage reduction circuit may be provided in the telephone electronics 24.

In addition to the vehicle battery 10 which is used as the main voltage source, an emergency battery 26 is provided as the auxiliary voltage source and can be connected via a controllable switch 27 to the voltage matching circuit 13, so that the voltage $U_N$ supplied by the emergency battery 26 can be applied to the voltage matching circuit 13. The function of switching the controllable switch 27 on and off is controlled by a switch control signal which is emitted from the voltage monitoring circuit 15 via a first output 28 if the voltage $U_B$ falls below a predetermined value, for example below 4 V or below 5 V, so that the voltage supply for the radio telephone 22 is transferred to the emergency battery 26.

As is shown in FIG. 1, the emergency battery 26 can be connected via the switch 27 and a line 27' to the same input 12 of the voltage matching circuit 13 to which the motor vehicle battery 10 is also connected. This circuit can be used in particular for emergency batteries 26 whose output voltage is less than the rated voltage of the vehicle electrical system.

If, on the other hand, an emergency battery 26 having a relatively high voltage is used, for example having a no-load voltage of 18 V, but which falls to 10 V whenever it is loaded, then the emergency battery 26 can also be connected via the switch 27 to a line 27", which is connected directly to the input 18 of the second voltage converter 19, as is shown in FIG. 2.

The voltage supply apparatus according to the invention thus makes it possible to continue to use the radio telephone 22 even in the event of an accident in which the connection between the radio telephone 22 and the motor vehicle battery 10 or vehicle electrical system N is interrupted. It is thus possible for the occupants of a motor vehicle involved in an accident, or for an automatic emergency telephone system to make an emergency call. In order in this case to ensure that the connection between the emergency battery 26 and the radio telephone 22 is also not interrupted, the emergency battery 26 is accommodated together with the voltage monitoring circuit 15 and the voltage matching circuit 13 in a housing 29 which accommodates the radio telephone 22.

As is shown in FIG. 3, the first voltage converter 16 has between the input 12 and its output 17 a series circuit comprising a coil 30 and a diode 31 configured, for example, as a Schottky diode. In order to allow the first voltage converter 16 to have a filter function, its input 12 and its output 17 are respectively connected to earth via a capacitor 32, 33. Together with the capacitors 32, 33, the coil 30 thus forms a low-pass filter, which at the same time smooths and stabilizes the first supply voltage $U_{12}$ which is present at the output 17.

The filtering effect of the low-pass filter formed by the coil 30 and the capacitors 32, 33 in this case and conversely, together with the diodes 31, 34, also prevents interference pulses and voltage spikes from the transmission radio-frequency amplifier 21 from being able to reach the vehicle electrical system N. In addition, the coil 30 and the capacitors 32, 33 act as energy stores which allow and assist uninterrupted maintenance of the supply voltage $U_{12}$ while switching the voltage supply over to the emergency battery 26.

In the situation when the voltage $U_B$ of the vehicle battery 10 (which is applied to the input 12 of the voltage matching circuit 13 via a diode 34) falls below a first predetermined value, for example 10 V, in order to ensure that the first supply voltage $U_{12}$ at the output of the voltage converter 16 is maintained, for example, at 12 V, the coil 30 interacts with a switched-mode regulator 35, to which the first supply voltage $U_{12}$ at the output of the first voltage converter 16 is supplied via a feedback line 36. To supply voltage, the switched-mode regulator 35 is connected to the capacitor 33 via a line 37. One output 38 of the switched-mode regulator 35 is connected to the junction point between the coil 30 and the diode 31, so that the junction point between the coil 30 and the diode 31 can periodically be drawn to earth during voltage-raising operation.

The operation of the switched-mode regulator 35 and of the voltage-raising circuit formed from the coil 30 and the switched-mode regulator 35 is controlled by the voltage monitoring circuit 15 in a manner which will be described later, depending on the voltage $U_B$ of the motor vehicle battery 10.

The second voltage converter 19, which is used to derive a second, lower supply voltage $U_5$ from the first supply voltage $U_{12}$, has a linear regulator 40 whose input is connected to the input 18 of the voltage converter 19, and whose output is connected via a diode 41 to the second output 23 of the voltage matching circuit 13. The linear regulator 40 is in this case preferably an integrated transistor circuit. A DC/DC voltage converter 42 forms a second voltage-reducing circuit and is connected, in parallel with the linear regulator 40, between the input 18 and the output 23. The output of this DC/DC voltage converter 42 is connected via a further diode 43, in particular a Schottky diode, to the second output 23 of the voltage matching circuit 13, so that the telephone electronics 24 in the radio telephone 22 are supplied with the second supply voltage $U_5$ either via the linear regulator 40 or via the DC/DC voltage converter 42.

In order to control the voltage-raising circuit 30, 35 in the first voltage converter 16 and the controllable switch 27 as a function of the voltage $U_B$ of the motor vehicle battery 10, the voltage monitoring circuit 15 has a first comparison circuit 44 and a second comparison circuit 45, the output signals of which comparison circuits are applied to a first AND gate 46 and to a second AND gate 47, which each form a gate circuit. The comparator circuits 44, 45, to which the voltage $U_B$ is itself applied as the voltage signal corresponding to the voltage $U_B$ of the vehicle battery, compare this voltage $U_B$ with a reference voltage Uref, which is present at the respective other inputs of the comparator circuits.

As soon as the voltage $U_B$ falls below a first predetermined value $U_{10}$ of, for example, 10 V, the first comparator circuit 44 emits a switch-on signal which is passed to the switched-mode regulator 35 in the voltage-raising circuit 30, 35 via the gate circuit 46 in the first voltage converter 16 only when an enable signal is supplied via a line 48 from the telephone electronics 24, indicating that the radio telephone 22 and/or the ignition of the motor vehicle are/is switched on. If neither the radio telephone 22 nor the ignition of the motor vehicle is switched on, then only the second supply voltage $U_{12}$ is required, although this is lower than the first predetermined voltage value $U_{10}$ and can also be provided anyway, via the continuously operating linear regulator 40 of the second voltage converter 19, if the voltage $U_B$ of the motor vehicle battery falls below this value. There is thus no need to operate the circuit 30, 35 to raise the voltage, and this is prevented by using the switched-off AND gate 46.

In a corresponding manner, the DC/DC voltage converter 42 is likewise operated only when the radio telephone 22 or the ignition of the motor vehicle is switched on. Otherwise, the second supply voltage $U_5$ is provided just by the linear regulator 40.

If, for example as a result of damage to the vehicle battery 10 or as a result of an interruption in the corresponding lines, the voltage $U_B$ falls below a second predetermined value, which preferably corresponds to the lowest voltage which can be expected during starting of the engine and may be, for example, 4 V or 5 V, then this fall in the voltage $U_B$ is detected by the second comparator circuit 45, which emits a corresponding switch control signal via the output 28 to the associated AND gate 47. Normally, an enable signal is present on the AND gate 47 via the line 49, so that the controllable switch 27 is closed, resulting in the voltage supply for the radio telephone 22 being switched over smoothly to the emergency battery 26 in the absence of the voltage $U_B$.

In the case of the voltage supply apparatus according to FIG. 1, in order to prevent current from flowing out of the emergency battery 26 into the vehicle electrical system N, the diode 34 prevents the current from flowing from the emergency battery 26 to the vehicle electrical system N and to the vehicle battery 10.

However, for maintenance work on the motor vehicle in the workshop, the terminals of the battery 10 have to be disconnected so that, for this situation, the invention provides for the capability to switch off the enable signal which is applied to the AND gate 47 via the line 49, in order to prevent voltage being supplied by the emergency battery 26, which would considerably shorten the life of said emergency battery 26.

The voltage supply apparatus according to the invention for a radio telephone 22 allows four different operating modes.

During normal operation, that is to say when the voltage $U_B$ of the motor vehicle battery 10 and the output voltage produced at the connecting terminal 11 by the generator in the vehicle electrical system N are in the range between 10 V and 16 V, in particular normally being about 13.5 V, the controllable switch 27 is open, while the voltage monitoring circuit keeps the voltage-raising circuit in the first voltage converter 16 inactive. Thus, by virtue of its filter function, the voltage converter 16 supplies a smoothed and stabilized first supply voltage $U_{12}$, which is supplied to the radio-frequency amplifier 21 of the radio telephone 22 and to the second voltage converter 19, which uses this voltage to derive the second supply voltage $U_5$ for the rest of the telephone electronics 24.

If the voltage $U_B$ of the vehicle battery 10 falls below a value $U_{10}$ of, for example, 10 V or, as assumed here, 11 V, then this drop is detected by the first comparator circuit 44 in the voltage monitoring circuit 15, which then supplies a switch-on signal for the switched-mode regulator 35 and the voltage-raising circuit 30, 35, via the AND gate 46 which is open when the ignition is switched on. In this mode, the voltage at the output 17 of the voltage converter 16 is kept at the required value, for example 12 V, with the aid of the coil and the switched-mode regulator 35. The second supply voltage $U_5$ is derived from the first supply voltage $U_{12}$ by the voltage converter 19, in the same way as during normal operation.

If the connection to the vehicle battery 10 or to the vehicle electrical system N is interrupted, then the voltage $U_B$ falls below the second predetermined value of, for example, 4 or 5 V, and this is detected by the second comparator circuit 45 in the voltage monitoring circuit 15. Via the output 28, the voltage monitoring circuit 15 then supplies (in the described manner) the switch control signal for the switch 27, which then closes and connects the emergency battery 26 in order to supply voltage to the radio telephone 22, so that the voltage $U_N$, as the supply voltage for the voltage matching circuit 13, is present at the input 12 of the latter (FIG. 1), or at the input 18 of the second voltage converter (FIG. 2).

When, as is illustrated in FIG. 1, the voltage $U_N$ is present at the input 12 of the voltage matching circuit 13, then, as in the second operating mode, the circuit comprising the coil 30 and the switched-mode regulator 35 now raises the input voltage of, for example, 5 V to the voltage of, for example, 12 V required to supply the radio-frequency amplifier 21. However, if an emergency battery 26 having a relatively high voltage $U_N$ is used, the emergency battery 26 can also be connected, as is shown in FIG. 2, directly to the input 18 of the second voltage converter 19. Since the input 18 is connected to the output 17 of the first voltage converter, and hence at the same time also to the output 20 of the voltage matching circuit 13, the voltage $U_N$ is in this case used as a first supply voltage $U_{12}$ and as the supply voltage for deriving the second supply voltage $U_5$ by means of the second voltage converter 19.

For the servicing mode in the workshop, the enable signal on the line 49 is switched off, so that the vehicle battery 10 can be disconnected and removed without any problems, and without the emergency battery 26 being switched on.

The invention has been described by way of example using a voltage supply apparatus for a radio telephone in a motor vehicle having a rated vehicle electrical system voltage of 12 V. The individual voltage values used as an example can, however, be different depending on the main supply voltage and circuit technology used, and thus may be correspondingly changed.

In addition to the described use of the voltage apparatus according to the invention for a radio telephone in a motor vehicle, it is also possible to use the voltage apparatus according to the invention for other safety-relevant devices, which must be kept serviceable for a certain time even after failure of a main voltage source having a relatively high voltage. If it is intended to use an auxiliary voltage source with a low voltage in this case, then this source is expediently connected to the same input as the main voltage source.

What is claimed is:

1. Voltage supply apparatus, in particular for a radio telephone, in a motor vehicle having:
   a main voltage source which is connected to one input of a voltage matching circuit which derives at least one supply voltage from the voltage present at its input,
   an auxiliary voltage source which can be connected via a controllable switch to the voltage matching circuit,
   a voltage monitoring circuit to which a voltage signal corresponding to the voltage of the main voltage source is supplied and which supplies a switch control signal in order to connect the auxiliary voltage source to the voltage matching circuit in an emergency in the event of failure of the main voltage source,
   wherein the voltage matching circuit comprises a first voltage converter which outputs a first supply voltage at its output, and a second voltage converter which supplies a second supply voltage which is less than the first supply voltage,
   wherein the first voltage converter has a filter circuit and a voltage-raising circuit, and
   wherein the voltage-raising circuit has a control input which is connected to the output of the first voltage converter, in order to keep the supply voltage at a stabilized value independently of the voltage which is present at the input.

2. Voltage supply apparatus, in particular for a radio telephone, in a motor vehicle having:
   a main voltage source which is connected to one input of a voltage matching circuit which derives at least one supply voltage from the voltage present at its input, an auxiliary voltage source which can be connected via a controllable switch to the voltage matching circuit, a voltage monitoring circuit to which a voltage signal corresponding to the voltage of the main voltage source is supplied and which supplies a switch control signal in order to connect the auxiliary voltage source to the voltage matching circuit in an emergency in the event of failure of the main voltage source, wherein the voltage matching circuit comprises a first voltage converter which outputs a first supply voltage at its output, and a second voltage converter which supplies a second supply voltage which is less than the first supply voltage, and wherein the second voltage converter comprises a first, continuously operating voltage-reducing circuit and, in parallel with this, a second voltage-reducing circuit, which can be switched on and off.

3. Voltage supply apparatus, in particular for a radio telephone, in a motor vehicle having:

a main voltage source which is connected to one input of a voltage matching circuit which derives at least one supply voltage from the voltage present at its input, an auxiliary voltage source which can be connected via a controllable switch to the voltage matching circuit, and a voltage monitoring circuit to which a voltage signal corresponding to the voltage of the main voltage source is supplied and which supplies a switch control signal in order to connect the auxiliary voltage source to the voltage matching circuit in an emergency in the event of failure of the main voltage source, wherein the voltage monitoring circuit has a first comparator circuit and a second comparator circuit, which comparator circuits compare a voltage signal which corresponds to the voltage of the main voltage source with a reference voltage signal, the first comparator circuit supplying a switch-on signal for a voltage-raising circuit in a first voltage converter in the voltage matching circuit if the voltage of the main voltage source falls below a first value, and the second comparator circuit supplying the switch control signal if the voltage of the main voltage source falls below a second value.

* * * * *